No. 796,952. PATENTED AUG. 8, 1905.
E. F. ATHERTON.
DIE FOR FORMING HORSESHOE CALKS.
APPLICATION FILED JULY 19, 1904.

2 SHEETS—SHEET 1.

Witnesses
Inventor
E. F. Atherton.
By
Attorneys

No. 796,952. PATENTED AUG. 8, 1905.
E. F. ATHERTON.
DIE FOR FORMING HORSESHOE CALKS.
APPLICATION FILED JULY 19, 1904.
2 SHEETS—SHEET 2.
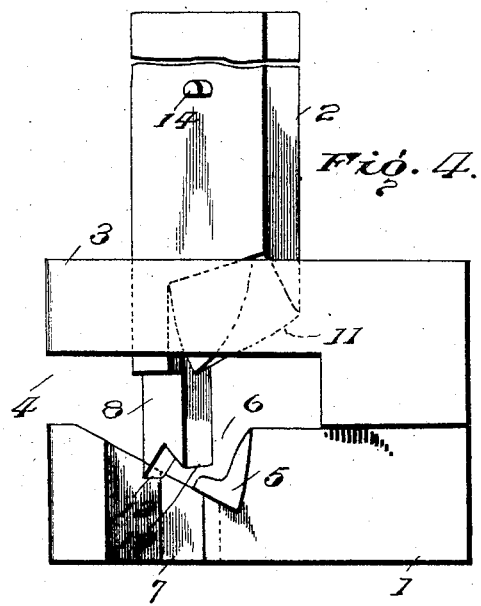
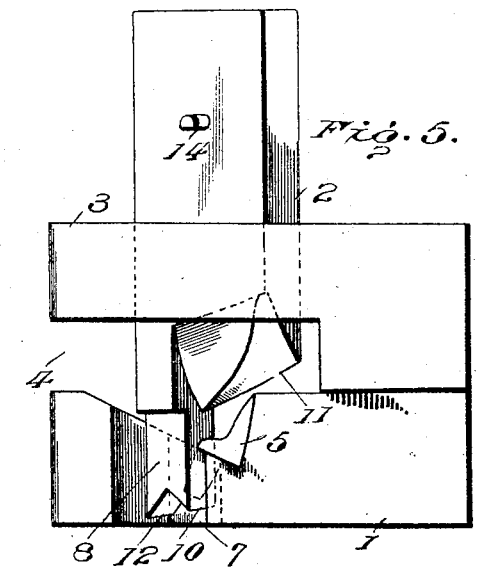
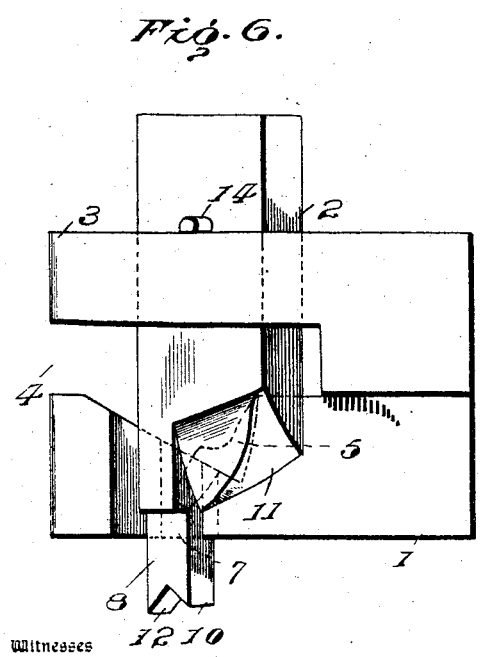
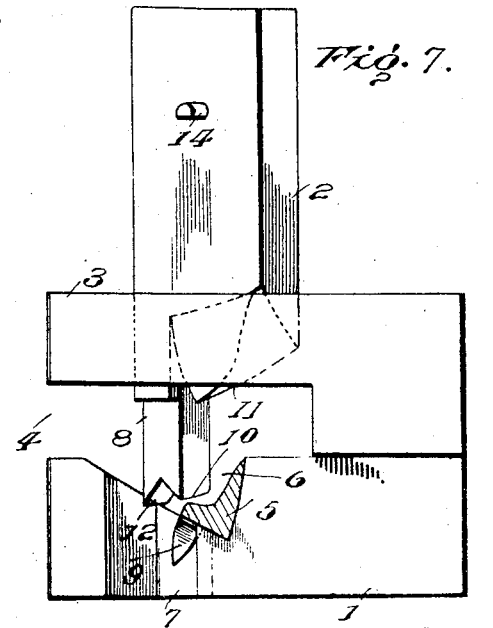
Witnesses
Inventor
E. F. Atherton
By
Attorneys

UNITED STATES PATENT OFFICE.

EDWIN F. ATHERTON, OF MACEDON, NEW YORK.

DIE FOR FORMING HORSESHOE-CALKS.

No. 796,952.          Specification of Letters Patent.          Patented Aug. 8, 1905.

Application filed July 19, 1904. Serial No. 217,243.

*To all whom it may concern:*

Be it known that I, EDWIN F. ATHERTON, a citizen of the United States, residing at Macedon, in the county of Wayne and State of New York, have invented certain new and useful Improvements in Dies for Forming Horseshoe-Calks, of which the following is a specification.

This invention has for its object to provide dies of novel structure for cutting bars into lengths to form horseshoe-calks and at the same time to form a spur on the calks by cutting and pressing a portion from the bar.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
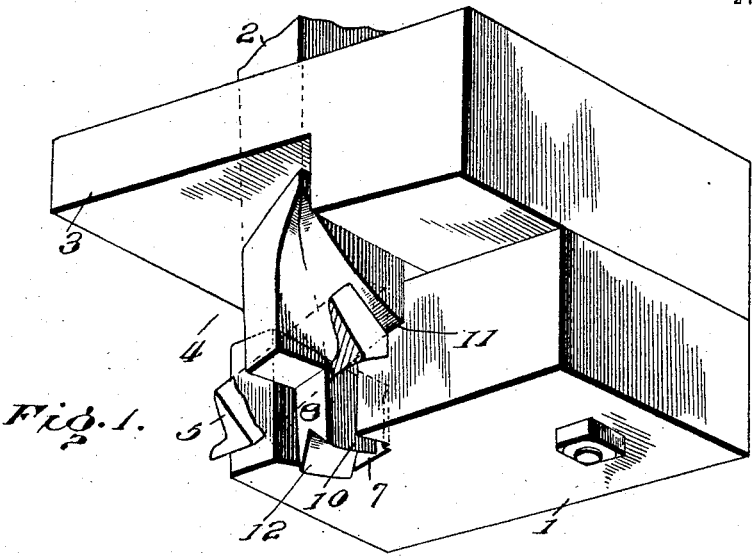
Figure 2:
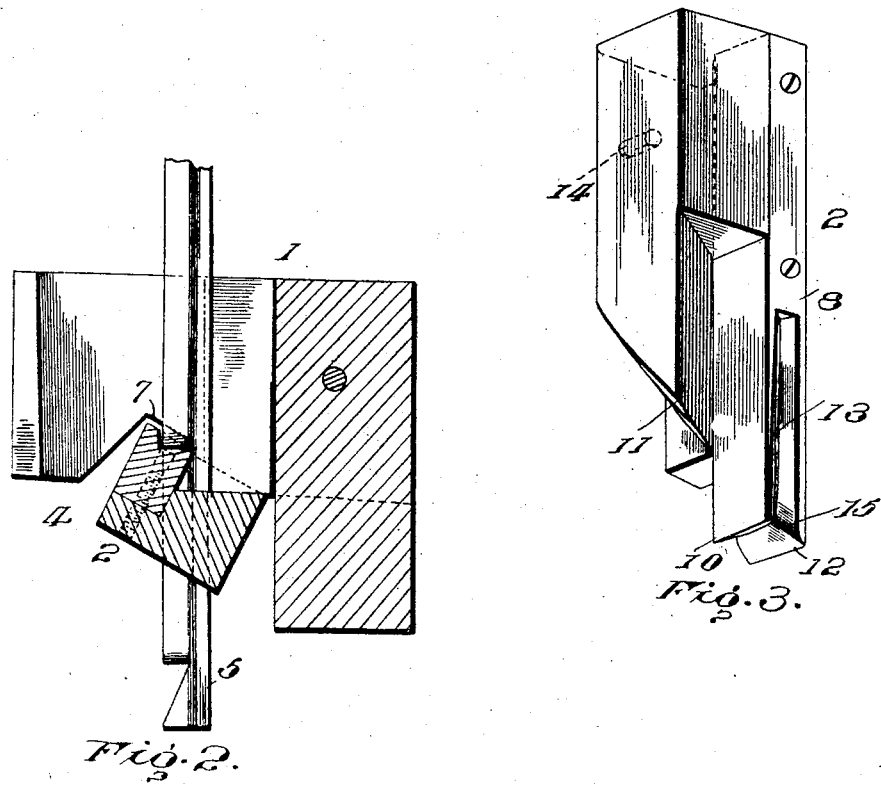
Figure 3:
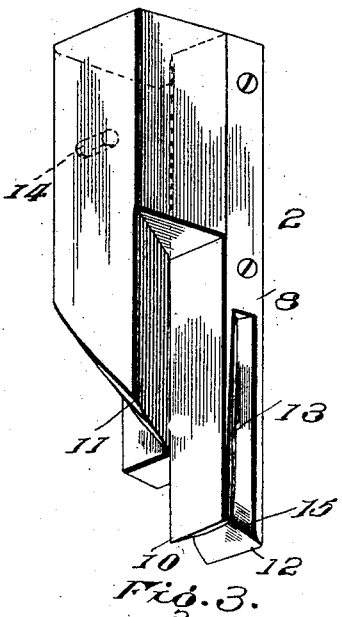

Figure 1 is a perspective view of dies embodying the invention, showing the same in operation. Fig. 2 is a plan section of the dies on a line corresponding with the upper surface of the bed. Fig. 3 is a perspective view of the cutter. Fig. 4 is a side view of the dies, showing a bar in position and the cutter elevated. Fig. 5 is a view similar to Fig. 4, showing the cutter moved so as to form the spur and preliminary to cutting the calk from the bar. Fig. 6 is a view showing the relation of the cutter when moved so as to sever the calk from the bar or blank. Fig. 7 is a view illustrating the cutter in a normal position after a calk has been cut from the bar or blank, showing the spur formed on the bar for the next calk.

Corresponding and like parts are referred to in the following description and indicated in all the views of the drawings by the same reference characters.

The invention comprises a bed, a cutter, and a guide. The bed is indicated at 1, the cutter at 2, and the guide at 3. The bed and guide may be separately formed or of integral structure, as may be desired. A space 4 intervenes between the bed and guide and admits of proper manipulation of the bar or blank 5. A depression or groove 6 is formed in the upper side of the bed to form a seat for reception of the bar or blank 5, said seat being approximately of V form, so as to correspond to adjacent sides of the bar 5. A groove 7 is formed in an edge or side of the bed 1 and intersects with the seat 6. The groove 7 receives the lower end of the cutter member 8, by means of which the spur 9 is formed on the bar or blank 5 in the formation of the calk. The groove 7 extends into the bed in an oblique or inclined direction to form the inclined edge upon the bed coöperating with the edge 10 of the cutter member 8, by means of which the inclined cut is formed in the flange or part of the bar 5 in the formation of the spur. The edge formed at the intersection of a side of the bed with the walls of the seat 6 in the rear of the groove 6 coöperates with the edge 11 of the cutter 2 when cutting the bar or blank 5 into lengths in the formation of the calks.

The cutter may consist of a single element, but is preferably composed of two members connected in any substantial manner, so as to operate as a single part. One of the members, as 8, projects beyond the cutting edge 11 of the other member, so as to form the spur 9 in advance of severing the calk from the bar or blank 5. The member 8 has its cutting edge 10 arranged at an acute angle to the plane of the cutting edge 11 of the other member, so as to form an inclined or oblique cut in the flange or part of the bar to separate the part destined to form the spur. A guard 12 is formed at a distance from the cutting edge 10, and a U-shaped channel separates the cutting edge 10 from the edge of the guard 12 and is adapted to receive the end portion of the part cut from the bar 5 to form the spur. The side of the member 8 facing the bed is grooved lengthwise of the cutter, as shown at 13, to receive the spur 9 during the bending of the part cut from the bar to form the same. The intersection of the walls of the groove 13 with the walls of the groove in the end of the member 8 is rounding, as indicated at 15, so as to deflect the part of the bar partly severed by the inclined cut to form the spur 9. The cutting edge 11 is arranged some distance from the cutting edge 10 and is inclined, so as to operate by a draw cut when cutting the bar or blank 5 to form the calks.

The bar or blank 5 from which the calks are to be formed is placed in the seat or channel 6 about as shown in Fig. 4 and is moved so as to have a part project beyond the edge of the bed. The cutter 2 is now moved downward either by means of a lever or in any manner commonly employed for operating punches. As the cutter descends the edge 10 of the member 8 forms an inclined cut in the bar, and in the further operation of the cutter the part of the bar partly severed by the inclined cut is bent outward to form the spur 9. The part corresponding to the spur when thrown outward by the inner beveled wall forming the edge 10 is arrested by the part 12, forming the guard, and is bent downward by the blunt edge 15 over the inner wall of the groove 7, the combined action giving to the spur the form and relative position substantially as shown in Fig. 7. A continued movement of the cutter brings the edge 11 in contact with the bar and severs the part projecting beyond the bed. The cutter is now returned to a normal position, as indicated in Fig. 7, thereby disclosing the spur formed on the bar. The bar is now moved a distance corresponding to the length of the calk, and the next operation of the cutter severs the calk from the bar and forms a spur near the end portion of the bar corresponding to the next calk. It is to be understood that the cutter may be operated by delivering a blow thereon by means of a hammer or like tool. A pin 14, projected from a side of the cutter, limits its downward movement.

While the machine is shown specially adapted for a particular construction of bar, nevertheless it may be used for forming spurs on bars of varying cross-sectional outline and cutting said bars into lengths corresponding with the calks. Thus usual calk-bars may be worked by a machine embodying the invention.

Having thus described the invention, what is claimed as new is—

1. In dies for forming horseshoe-calks, the combination of a bed provided in its top face with a seat for receiving the bar or blank from which the calks are to be formed, said bed having a groove in one edge, and a cutter having a projecting portion to operate in the groove formed in the side of the bed and a portion formed with an edge to operate in conjunction with the side of the bed to sever the bar into pieces, substantially as set forth.

2. In dies for forming horseshoe-calks, the combination of a bed having a seat in its upper face, and a groove in its side intersecting the said seat, one wall of said groove being inclined and intersecting with the seat to form an edge, and a cutter having edges at different points in its length and arranged relatively at an acute angle to each other, one of the edges adapted to form an oblique cut in the blank or calk-bar and the other edge adapted to sever the bar into lengths, substantially as specified.

3. In dies for forming horseshoe-calks, the combination of a bed having a seat in its upper face and a groove in one side intersecting the said seat, and a cutter having a projecting portion formed with an edge to form a cut in the calk-bar and to press the portions of said bar severed therefrom by the cut into the groove to form a spur, said cutter having a second edge in the rear of the spur-forming edge to sever the calk from the bar, substantially as set forth.

4. In dies for making horseshoe-calks, the combination of a bed provided in its upper face with a seat to receive the bar from which the calks are formed and having a groove in a side intersecting with said seat, a cutter having an edge for severing the bar and having a projecting portion formed with an edge to form a cut in the bar and having a groove in the side facing the bed to press the portion partly severed from the bar by the cut to form a spur, substantially as described.

5. In dies for making horseshoe-calks, the combination of a bed having a seat in its upper face and a groove in one side, and a cutter having an edge to partly sever a portion of the calk-bar and having a guard spaced from the cutting edge, and a vertical groove in the side facing the bed, substantially as set forth.

6. In dies for forming horseshoe-calks, the combination of a bed having a seat in its upper face and a groove in one side intersecting the said seat, and a cutter having a projecting portion provided at its end with a cutting edge and a guard and having a groove in the side facing the edge, said cutter having a second edge to operate in the rear of the first cutting edge for severing the calks from the bar after the formation of the spur, substantially as set forth.

In testimony whereof I affix my signature in presence of two witnesses.

EDWIN F. ATHERTON. [L. S.]

Witnesses:
ABRAM R. BULLIS,
ELI H. GALLUP.